(12) United States Patent
Jiménez Pastor et al.

(10) Patent No.: US 12,554,969 B2
(45) Date of Patent: Feb. 17, 2026

(54) METHOD AND SYSTEM FOR THE AUTOMATIC SEGMENTATION OF WHITE MATTER HYPERINTENSITIES IN MAGNETIC RESONANCE BRAIN IMAGES

(71) Applicant: QUIBIM, S.L., Valencia (ES)

(72) Inventors: Ana María Jiménez Pastor, Valencia (ES); Eduardo Camacho Ramos, Valencia (ES); Fabio García Castro, Valencia (ES); Ángel Alberich Bayarri, Valencia (ES); Josep Puig Alcántara, Valencia (ES); Carles Biarnes Durán, Valencia (ES); Luis Martí Bonmatí, Valencia (ES); Salvador Pedraza Gutiérrez, Valencia (ES)

(73) Assignee: QUIBIM, S.L., Valencia (ES)

( * ) Notice: Subject to any disclaimer, the term of this patent is extended or adjusted under 35 U.S.C. 154(b) by 1002 days.

(21) Appl. No.: 17/762,628

(22) PCT Filed: Jan. 30, 2020

(86) PCT No.: PCT/ES2020/070069
§ 371 (c)(1),
(2) Date: Mar. 22, 2022

(87) PCT Pub. No.: WO2021/058843
PCT Pub. Date: Apr. 1, 2021

(65) Prior Publication Data
US 2022/0343142 A1 Oct. 27, 2022

(30) Foreign Application Priority Data
Sep. 23, 2019 (ES) ................. ES201930818

(51) Int. Cl.
*G06N 3/045* (2023.01)
*G06N 3/048* (2023.01)
(Continued)

(52) U.S. Cl.
CPC ............. *G06N 3/045* (2023.01); *G06N 3/048* (2023.01); *G06N 3/08* (2013.01); *G16H 30/40* (2018.01)

(58) Field of Classification Search
CPC .......... G06N 3/045; G06N 3/048; G06N 3/08; G06N 3/09; G06N 3/0455; G06N 3/0464;
(Continued)

(56) References Cited

U.S. PATENT DOCUMENTS

| 2018/0260951 A1 | 9/2018 | Yang et al. |
| 2019/0015059 A1* | 1/2019 | Itu ........................... G06T 7/143 |

(Continued)

FOREIGN PATENT DOCUMENTS

| CN | 108171711 A | 6/2018 |
| CN | 109410167 A | 3/2019 |

(Continued)

OTHER PUBLICATIONS

Yu, F. et al., "Dilated Residual Networks", https://arxiv.org/abs/1705.09914 (Year: 2017).*

(Continued)

*Primary Examiner* — Alexey Shmatov
*Assistant Examiner* — Devika S Maharaj
(74) *Attorney, Agent, or Firm* — Sughrue Mion, PLLC (57) ABSTRACT

The present invention relates to a method and a system for the segmentation of white matter hyperintensities (WMHs) present in magnetic resonance brain images, comprising: providing an array of trained convolutional neural networks (CNNs) with a magnetic resonance brain image; determining, for each of the CNNs and for each voxel, the probability that the given voxel corresponds to a pathological hyperintensity; calculating the average of all the probabilities determined for each voxel; comparing the averaged probabilities (Continued)

for each voxel with a threshold; generating an image mask with the voxels that exceed the threshold.

13 Claims, 5 Drawing Sheets

(51) Int. Cl.
    *G06N 3/08*         (2023.01)
    *G16H 30/40*      (2018.01)

(58) Field of Classification Search
    CPC .................. G06N 3/04; G16H 30/40; G06T 2207/10088; G06T 2207/20081; G06T 2207/20084; G06T 2207/30016; G06T 2207/30096; G06T 7/0012; A61B 5/055
    See application file for complete search history.

(56) References Cited

U.S. PATENT DOCUMENTS

| | | | | |
|---|---|---|---|---|
| 2019/0377047 | A1* | 12/2019 | Chen | G01R 33/5608 |
| 2020/0302596 | A1* | 9/2020 | Yoo | G06T 7/11 |
| 2022/0287671 | A1* | 9/2022 | Huang | A61B 6/037 |

FOREIGN PATENT DOCUMENTS

| | | | |
|---|---|---|---|
| CN | 109872328 | A | 6/2019 |
| CN | 109886273 | A | 6/2019 |
| CN | 109993735 | A | 7/2019 |
| CN | 109993809 | A | 7/2019 |
| CN | 110189334 | A | 8/2019 |
| WO | 2018/140596 | A2 | 8/2018 |
| WO | 2018/229490 | A1 | 12/2018 |
| WO | 2019/109410 | A1 | 6/2019 |

OTHER PUBLICATIONS

Towards AI, "https://towardsai.net/p/data-science/how-when-and-why-should-you-normalize-standardize-rescale-your-data-3f083def38ff", May 16, 2019 (Year: 2019).*

Botian Xu et al., Orchestral fully convolutional networks for small lesion segmentation in brain MRI, 2018 Ieee 15th International Symposium On Biomedical Imaging (ISBI 2018), Apr. 4-7, 2018, pp. 889-892.

Jose Bernal et al., "Deep convolutional neural networks for brain image analysis on magnetic resonance imaging: a review", Artificial Intelligence in Medicine, 2019, pp. 64-81, vol. 95.

Davood Karimi et al., "Reducing the Hausdorff Distance in Medical Image Segmentation With Convolutional Neural Networks", Ieee Transactions On Medical Imaging, Feb. 2020, pp. 499-513, vol. 39, No. 2.

International Search Report for PCT/ES2020/070069 dated, Jun. 2, 2020 (PCT/ISA/210).

International Preliminary Report on Patentability dated, Mar. 21, 2022.

* cited by examiner

METHOD AND SYSTEM FOR THE AUTOMATIC SEGMENTATION OF WHITE MATTER HYPERINTENSITIES IN MAGNETIC RESONANCE BRAIN IMAGES

CROSS REFERENCE TO RELATED APPLICATIONS

This application is a National Stage of International Application No. PCT/ES2020/070069 filed Jan. 30, 2020, claiming priority based on Spanish Patent Application No. P201930818 filed Sep. 23, 2019.

OBJECT OF THE INVENTION

The present invention relates to the technical field of computer-assisted analysis of medical images and more specifically to the processing by means of convolutional neural networks of images obtained by magnetic resonance, for an automatic segmentation of the images based on the volume of leukoaraiosis, especially useful for the study of radiologists-neurologists on possible brain injuries.

BACKGROUND OF THE INVENTION

Currently, magnetic resonance imaging is a preliminary diagnostic tool commonly used to detect abnormalities in tissues. Specifically, in the field of neuroradiology, it is used by specialists to diagnose white matter injuries, among other things.

White matter injuries are observed in the magnetic resonance images as hyperintensities in the sequence of fluid-attenuated inversion recovery (FLAIR), however, not all the hyperintensities observed correspond to injuries, but other physiological hyperintensities also appear, such as the ependyma (a layer of cells which lines the cerebral ventricles), the cerebral cortex and the skull.

In this context, the volume of leukoaraiosis is used in medicine precisely to detect the diffuse loss of density in various regions of the white matter of the brain. However, it is not a diagnosis, but rather a radiological finding related to alterations in the white matter (hyperintensities in this case) and which is detected by means of images obtained by, among other techniques, magnetic resonance imaging. In other words, leukoaraiosis is a descriptive neuroimaging term that appears both in people in good health and in different clinical and pathological situations, including Alzheimer's disease and other dementias, although there are no specific associated symptoms.

The work required of specialist neurologists-radiologists to interpret these images turns out to have very high precision, not only in order to make their diagnosis, but also simply to differentiate the areas that can be studied from those that cannot.

The state of the art includes some systems to help specialists based on artificial intelligence for the segmentation of the images, but they are not robust enough to offer the precision required in such a specific field of application.

Therefore, a high-precision imaging solution for the automatic segmentation of magnetic resonance images is lacking in the state of the art, which can help specialists in their subsequent diagnoses and studies of white matter injuries.

DESCRIPTION OF THE INVENTION

In order to achieve the objectives and avoid the drawbacks mentioned above, the present invention describes, in a first aspect, a method for segmenting white matter hyperintensities present in magnetic resonance brain images comprising:

providing an array of previously trained convolutional neural networks with a magnetic resonance brain image;

identifying the voxels of the image containing white matter hyperintensities;

determining, for each of the convolutional neural networks and for each voxel, the probability that the identified hyperintensity corresponds to a previously defined pathological hyperintensity;

calculating the average of all the probabilities determined for each voxel;

comparing the averaged probabilities for each voxel with a pre-established threshold; and generating an image mask with the voxels that exceed the threshold.

Additionally, one of the embodiments of the invention envisages pre-processing of the provided image comprising: sizing each 2D section of the image to a size of 256×256; scaling the intensity values of each 2D section between 0 and 1, according to the equation:

$$I'_{i,j} = \frac{I_{i,j} - \min(I)}{\max(I) - \min(I)}$$

wherein I is the 2D section to be scaled, $I_{i,j}$ the intensity value in row i and column j, min(I) is the minimum value of the section and max(I) is its maximum value; and standardising each voxel by subtracting the mean of a training data set and dividing by the standard deviation of the training data set, according to the following equation:

$$I''_{i,j} = \frac{I'_{i,j} - \mu}{\sigma}$$

wherein I' is the scaled intensity; μ is the mean intensity of the scaled training data set, and σ is the standard deviation of the scaled training data set.

In one of the embodiments of the present invention, the array of convolutional neural networks comprises a standard convolutional neural network, a residual convolutional neural network, a dilated convolutional neural network, and a dilated-residual convolutional neural network, all based on an encoder-decoder architecture. Advantageously, the combination of these neural networks produces better results than those offered when they are used alone.

In order to determine the probability that the hyperintensity identified in a voxel corresponds to a pathological hyperintensity, according to one of the embodiments of the invention, the following steps are envisaged: filtering, by means of convolution operations, the magnetic resonance brain image, in convolutional layers of each of the convolutional neural networks; reducing the image by means of intermediate reduction layers intercalated between the convolutional layers arranged in an encoding path; enlarging the image by means of convolutional transposition layers intercalated between the convolutional layers arranged in a decoding path; refining the output of the convolutional neural network by means of deep supervision layers; and defining a probability map of the presence of hyperintensity by means of a sigmoid activation function.

In one of the embodiments of the invention, it envisages generating, for each of the convolutional neural networks, a probability map with the probability determined for each voxel of the image.

In one of the embodiments of the invention, it envisages generating a total probability map representing, averaged for each voxel, the probabilities determined by the convolutional neural networks for each voxel.

According to one of the possible embodiments of the present invention, the probability threshold determining whether to include each voxel in the image mask is set at 50%.

The training of the convolutional neural networks of the present invention comprises, in one of the preferred embodiments thereof, applying a Tversky loss function. Thus, advantageously, the imbalance is equilibrated between the number of voxels that exceed the pre-established threshold and those that do not.

A second aspect of the present invention relates to a system for segmenting white matter hyperintensities present in magnetic resonance brain images, comprising:
- an arrangement of convolutional neural networks configured to receive a magnetic resonance brain image, identifying the voxels of the image containing white matter hyperintensities, and determining, for each of said networks, the probability that the identified hyperintensity for each voxel corresponds to a previously defined pathological hyperintensity; and
- a processor module configured to calculate the average of all the probabilities determined for each voxel, comparing the probabilities averaged for each voxel with a pre-established threshold, and generating an image mask with the voxels that exceed the threshold.

The arrangement of neural networks comprises, according to one of the preferred embodiments of the present invention, at least one standard neural network comprising: convolutional layers configured to filter the magnetic resonance brain image by means of convolution operations; reduction layers intercalated between the convolutional layers in an encoding path, configured to reduce the image; transposition layers intercalated between the convolutional layers in a decoding path, configured to enlarge the image; a bottleneck section between the encoding path and the decoding path; a sigmoid activation layer configured to generate a probability map; and deep supervision layers configured to combine the output of the convolutional layers of the decoding path.

In one of the embodiments of the present invention, the arrangement of neural networks comprises at least one residual convolutional neural network, in turn comprising: residual blocks configured to filter the magnetic resonance brain image by means of convolution operations; reduction layers intercalated between the residual blocks in an encoding path, configured to reduce the image; transposition layers intercalated between the residual blocks in a decoding path, configured to enlarge the image; a bottleneck section between the encoding path and the decoding path; a sigmoid activation layer configured to generate a probability map; and deep supervision layers configured to combine the output of the convolutional layers of the decoding path.

In one of the embodiments of the present invention, the arrangement of neural networks comprises at least one dilated convolutional neural network, in turn comprising: convolutional layers configured to filter the magnetic resonance brain image by means of convolution operations; reduction layers intercalated between the convolutional layers in an encoding path, configured to reduce the image; transposition layers intercalated between the convolutional layers in a decoding path, configured to enlarge the image; a bottleneck section between the encoding path and the decoding path, wherein said section comprises dilated convolutional layers with different rates of dilation; a sigmoid activation layer configured to generate a probability map; and deep supervision layers configured to combine the output of the convolutional layers of the decoding path.

In one of the embodiments of the present invention, the arrangement of neural networks comprises at least one dilated-residual convolutional neural network, in turn comprising: residual blocks configured to filter the magnetic resonance brain image by means of convolution operations; reduction layers intercalated between the residual blocks in an encoding path, configured to reduce the image; transposition layers intercalated between the residual blocks in a decoding path, configured to enlarge the image; a bottleneck section between the encoding path and the decoding path, wherein said section comprises dilated convolutional layers with different rates of dilation; a sigmoid activation layer configured to generate a probability map; and deep supervision layers configured to combine the output of the convolutional layers of the decoding path.

According to a particular embodiment of the present invention, the arrangement of neural networks is made up of the standard convolutional neural network, the residual convolutional neural network, the dilated convolutional neural network, and the dilated-residual convolutional neural network, all of them being configured with an image input size of 256×256, and wherein all the convolutional layers have a 3×3 receptive field, followed by a batch normalisation layer and a rectified linear unit layer.

A last aspect of the present invention relates to a computer-implemented method for segmenting white matter hyperintensities present in magnetic resonance brain images, comprising:
- providing an array of previously trained convolutional neural networks with a magnetic resonance brain image;
- identifying the voxels of the image containing white matter hyperintensities;
- determining, for each of the convolutional neural networks and for each voxel, the probability that the identified hyperintensity corresponds to a previously defined pathological hyperintensity;
- calculating the average of all the probabilities determined for each voxel;
- comparing the averaged probabilities for each voxel with a pre-established threshold; and
- generating an image mask with the voxels that exceed the threshold.

In one embodiment of the present invention, the convolutional neural networks are implemented in a central processing unit CPU.

In a specific embodiment of the present invention, at least one of the convolutional neural networks is implemented in a graphics processing unit GPU supporting the central processing unit.

Due to all of the above, the present invention has technical features which involve a multitude of advantageous effects. For example, the arrangement of neural networks described in the present invention enables discerning between physiological hyperintensities and hyperintensities that could correspond to white matter injuries, which makes it possible for a specialist to concentrate their work on the areas segmented by the present invention and included in the image mask, or even obtain additional quantitative parameters based on the segmentation provided in order to describe the injury load (such as volume or number of injuries) of people with leukoaraiosis. The benefits extend for example to the optimisation of the time of the specialist and in an increase in their precision.

Additionally, the novel combination of convolutional neural networks of the present invention offers greater robustness to the segmentation than any other of the known solutions. It enables the images to be processed by extracting characteristics at different levels, specifically focusing on the complex task of segmenting white matter injuries, which vary the distribution thereof from one person to another and require a special configuration such as that of the present invention.

BRIEF DESCRIPTION OF THE FIGURES

To complete the description of the invention and for the purpose of helping to better understand its features according to a preferred embodiment thereof, a set of drawings is attached in which the following figures are depicted in an illustrative and non-limiting manner.

DETAILED DESCRIPTION OF THE INVENTION

Below, at least one embodiment for carrying out the present invention will be described in detail, with reference to the figures mentioned previously. It will be obvious for one skilled in the art that the terms used in the present specification are simply used to describe particular embodiments, and are not intended to limit the present invention. Any expression used in the singular form encompasses the expression of the plural, unless it has a clearly different meaning in context. In the following description, terms such as "including", "have", etc. must be understood as being intended to indicate the existence of the features, numbers, steps, actions, elements, parts or combinations, but are not intended to exclude the possibility that one or more features, numbers, steps, actions, elements, parts or combinations may be added.

The present invention discloses a method and a system for the automatic segmentation of magnetic resonance brain images, which can be used to measure the volume of leukoaraiosis and which can subsequently be used by neurologists-radiologists to detect possible white matter injuries.

The method and system for automatic segmentation is an aid to the diagnosis of the specialists, by means of image processing, as detailed below, in order to finally provide in the output thereof an image mask generated from the individual processing of each voxel of the individual images, wherein the criteria established in order to determine whether a voxel belongs to an injury seek to differentiate, from among all the voxels in the image, those which correspond to pathological hyperintensities from those which do not, which will be of great help in subsequent studies, such as in the identification of white matter injuries.

The input images come from brain magnetic resonance images (MRI). From these magnetic resonance images, the FLAIR (fluid-attenuated inversion recovery) sequence is used to detect voxels belonging to injuries in the white matter of the brain. These white matter hyperintensities (WMH) are segmented by the present invention by means of generating a probability map for different CNNs which are combined and thresholding is performed in order to detect voxels comprising pathological hyperintensities.

Figure 1:
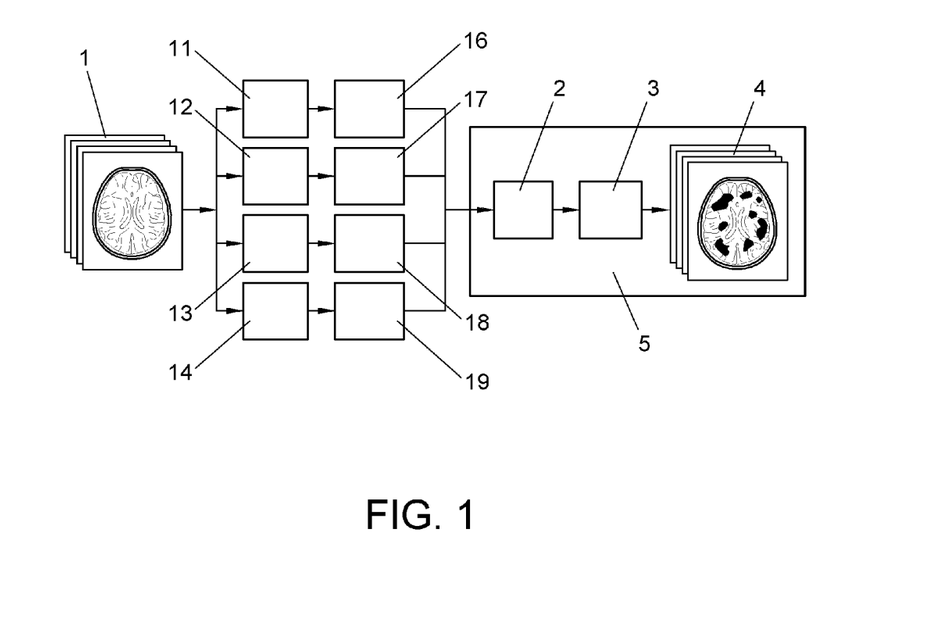
FIG. 1 represents a block diagram of an embodiment of the invention.

FIG. 1 represents the basic blocks of the invention, according to one of the embodiments thereof, wherein the image 1 is processed by an array of convolutional neural networks 11, 12, 13 and 14, abbreviated as CNN, each configured with a specific architecture and previously trained. Each of the CNNs provides a probability map 16, 17, 18 and 19 at the output thereof of the presence/absence of white matter injury in each voxel of the image. Then, in a processor module 5, the probability maps associated with each of the CNNs are averaged in order to obtain a final probability map 2, which sets the threshold 3 in order to generate the image masks 4 provided at the output.

In one embodiment of the invention, it envisages pre-processing of the input images, such that each 2D section of each 3D image is reshaped to a common size of 256×256, in order to fit the input size of the convolutional neural network architectures (CNN) used by means of applying a bicubic interpolation. The following is a two-step normalisation process for the entire training set:

1. Min-Max scaling: the intensity values of each 2D section are scaled between 0 and 1:

$$I'_{i,j} = \frac{I_{i,j} - \min(I)}{\max(I) - \min(I)}$$

wherein, I is the section to be scaled, $I_{i,j}$ the intensity value in row i and column j, min(I) is the minimum value of the section and max(I) is its maximum value; and 2. standardisation: the training data set is normalised in order to have a mean of zero and a variance of one. For that, each voxel is standardised by subtracting the mean of the training data set and dividing by the standard deviation of the training data set.

$$I''_{i,j} = \frac{I'_{i,j} - \mu}{\sigma}$$

wherein I' is the min-max scaled intensity; μ is the mean intensity of the scaled training data set, and a is the standard deviation of the scaled training data set.

Figure 4:
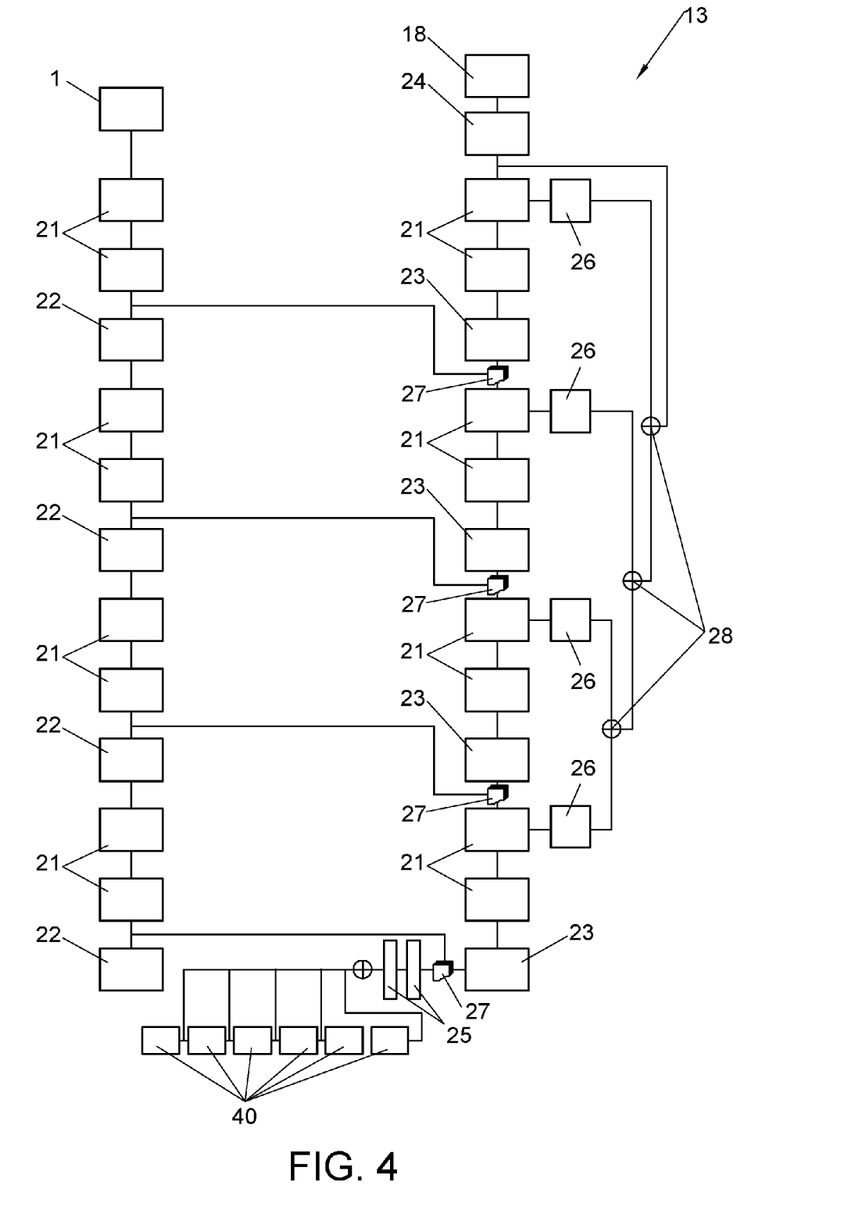
FIG. 4 represents in detail an embodiment of a dilated convolutional neural network used in the present invention.
Figure 5:
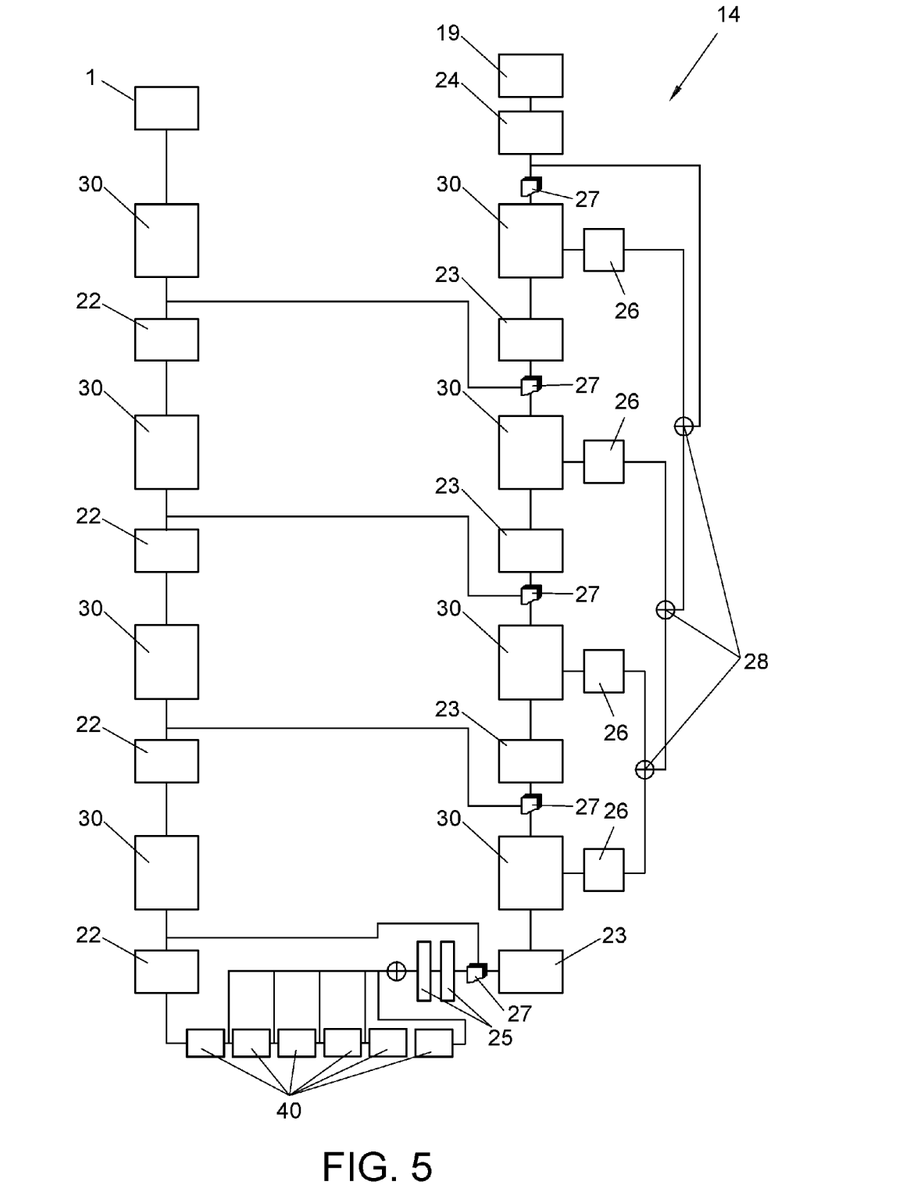
FIG. 5 represents in detail an embodiment of a dilated-residual convolutional neural network used in the present invention.

Once the image has been pre-processed as described above, it is provided to the four CNN networks, different from each other, wherein they are all based on an encoder-decoder architecture, but with the difference of using a standard CNN configuration 11 (represented in detail in FIG. 2), a CNN configuration with residual convolutional blocks 12 (represented in detail in FIG. 3), a CNN configuration with dilated convolutional filters 13, (represented in detail in FIG. 4) and the combination of both 14 (represented in detail in FIG. 5). The standard CNN 11 enables characteristics to be extracted at different levels, going from simpler characteristics based on edges and contrasts to more complex ones based on the shape of the image and the region of interest to be segmented. However, the segmentation of white matter injuries is a complex task since each patient has a different distribution thereof, for which reason more complex characteristics are necessary, which is achieved by increasing the number of convolutional layers in the networks; however, this leads to problems such as what is known as the vanishing gradient problem. The CNN with residual convolutional blocks 12 enables more complex characteristics to be obtained without needing to increase the number of convolutional layers. Moreover, in order to define whether a hyperintensity is pathological, it is necessary to have more information about the rest of the image, in other words, more contextual information; this is achieved with the CNN with dilated convolutional filters 13 which enables the region on which the characteristics are extracted to be increased. Therefore, this architecture is designed and optimised in order to extract different types of information from the image and increase the precision in the segmentation of the white matter injuries.

A decoder-encoder architecture has an encoding path wherein, given an input image, a high-dimensional characteristic vector is generated by adding characteristics at different levels; and a decoding path, wherein the previously generated characteristic vector is decoded at multiple levels in order to, finally, generate a probability map. Between the encoding and decoding layers, some bridge connections are arranged, combining both local and contextual information by means of concatenating characteristics coming from the encoding path with characteristics from the decoding path. Furthermore, some deep supervision layers are included. These layers enable a faster convergence, which means less training time and better delineation of the edges.

In one of the embodiments of the invention, in line with the pre-processing described above, all the architectures of convolutional neural networks have an input layer with a size of (256, 256, 1), the values corresponding to (# rows, # columns, # channels). The number of channels is set at 1 due to the fact that it is working with monochromatic images.

Figure 2:
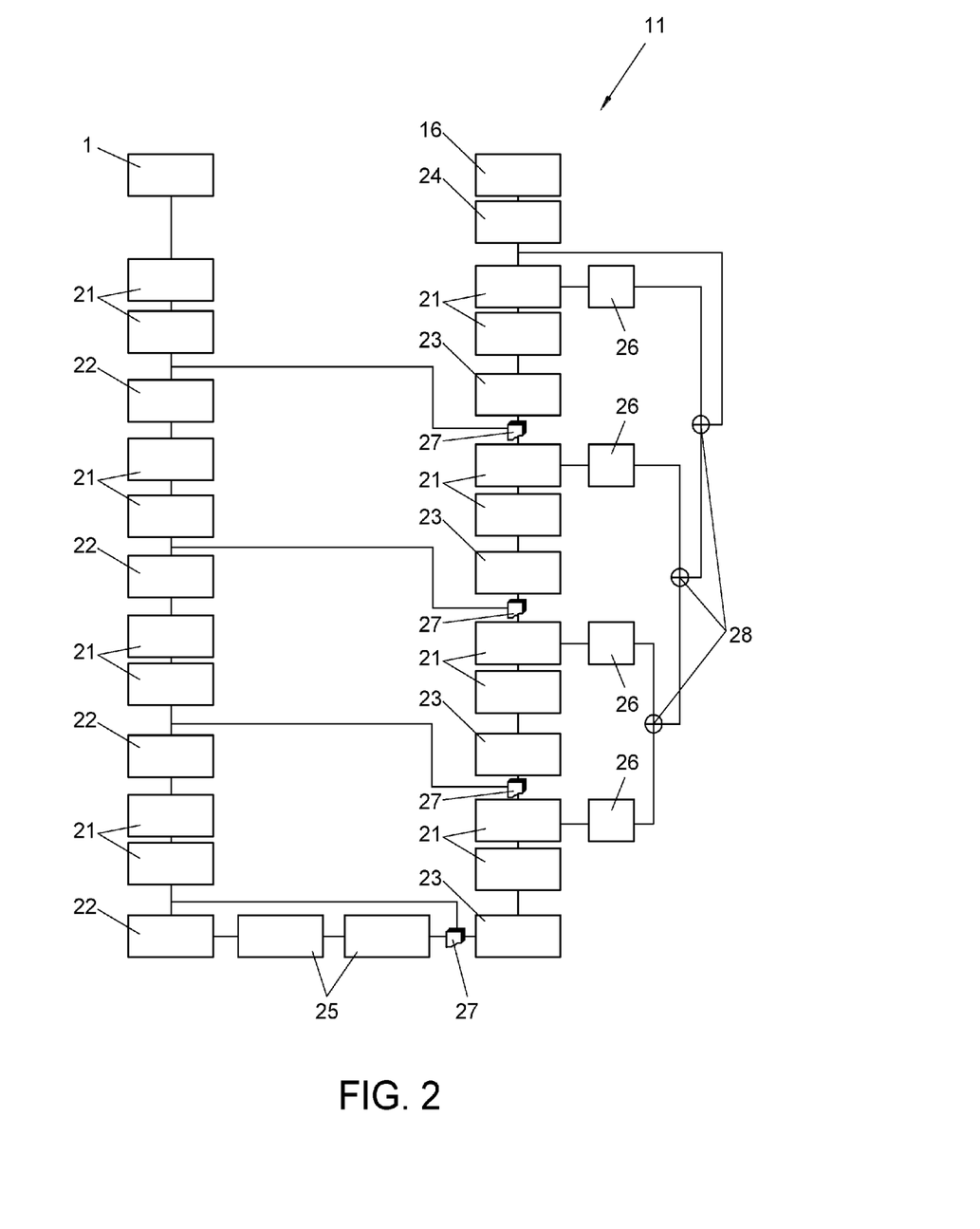
FIG. 2 represents in detail an embodiment of a standard convolutional neural network used in the present invention.

FIG. 2 represents in detail the architecture of the standard convolutional neural network 11 with an encoder-decoder configuration, which includes characteristics common to the other CNN networks.

The architecture of the encoding path represented comprises convolutional layers 21 alternated with intermediate reduction layers 22. All the convolutional layers have a 3×3 receptive field followed by a batch normalisation (BN) layer and a rectified linear unit (ReLU) layer. The BN layers normalise the output of the convolutional layers to a mean of zero and a variance of one, increasing the stability of the convolutional neural network (CNN). ReLU is an activation function which introduces non-linearities into the model. The max-pooling reduction layer 22 with a 2×2 core is arranged after every two convolutional layers 21, thus reducing the size of the image by half. After each max-pooling reduction layer, the number of filters in the convolutional layers is doubled.

Between the encoder and the decoder, a bottleneck section 25 is arranged formed by two convolutional layers equal to the previous ones. Thus, in an embodiment wherein the first two convolutional layers have 32 filters and the input image was sized at 256×256, after the four reduction layers 22, the two convolutional layers of the bottleneck section 25 between the encoder and the decoder layers have 512 filters for an image reduced to 16×16.

The decoding path has a similar architecture, the only difference is the replacement of the reduction layers 22 with convolutional transposition layers 23, with which the size of the image is doubled. In the same manner, the number of filters in each convolutional layer after each transposed layer is reduced to half. In the decoding path, prior to the transposition layers 23, a layer concatenation operator 27 is introduced. The layer concatenation operator 27 is also connected to the encoding path, such that it takes at the input thereof an array of matrices, all of them with the same size (except in the concatenation axis, which in the present embodiment is the one corresponding to the third dimension, in other words, the channel) and returns a matrix resulting from concatenating the previous ones at the output thereof. For example, with two inputs with dimensions [256, 256, 32], the output results in dimensions [256, 256, 64].

Additionally, deep supervision layers 26 are included made up of convolutional filters with a receptive field of 1×1 which combine the output from the second convolutional layer 21 of each of the convolutional blocks of the reduction path by means of a layer sum operator 28. A layer sum operator 28 takes as an input an array of matrices, all of them with the same size and returns at the output thereof a matrix with the same size corresponding to the sum of all of them. In the present embodiment, the sum is made along the third dimension, in other words, the dimension corresponding to the channel. For example, with two inputs with dimensions [256, 256, 32], the output results in the same dimensions [256, 256, 32].

In order to obtain the final probability map 16 in the output of the CNN, sigmoid activation functions 24 are included.

Figure 3:
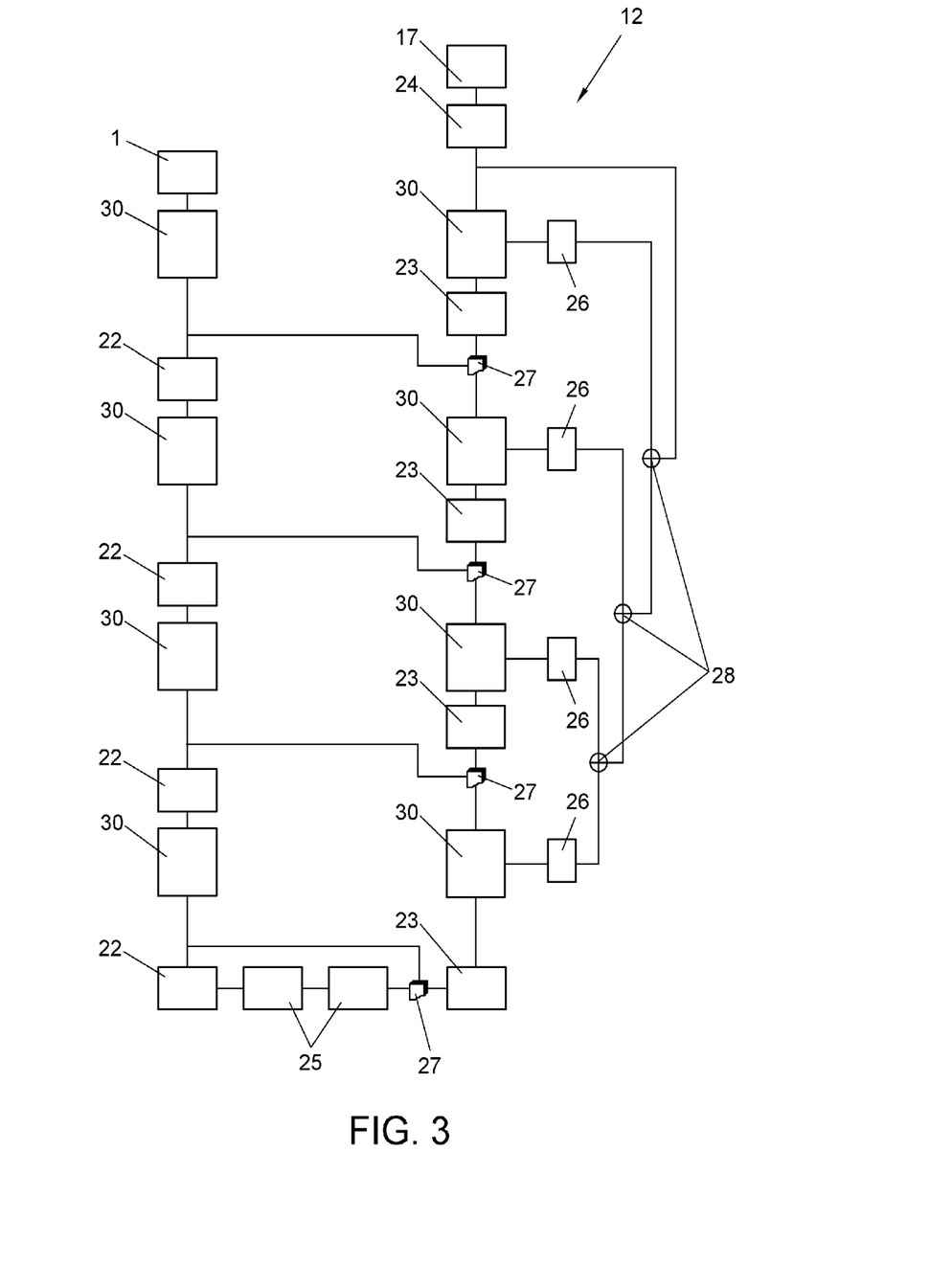
FIG. 3 represents in detail an embodiment of a residual convolutional neural network used in the present invention.

FIG. 3 represents in detail the architecture of the residual convolutional neural network 12, wherein the standard convolutional blocks 21 are substituted with residual blocks 30. When a CNN is trained, the precision increases as the number of layers increases, however there is a limit wherein the precision of the training starts to degrade. Thanks to the residual blocks, the training of some layers can be omitted; therefore, it enables deeper architectures to be designed without incorporating additional layers. Following each of the residual blocks 30, in both the encoding path and the decoding path, a layer concatenation operator 27 is included.

FIG. 4 represents in detail the architecture of the dilated convolutional neural network 13, wherein dilated convolutional layers 40 are included in the bottleneck section 25 between the encoder and the decoder layers. In this embodiment, six dilated convolutional layers 40 are included with respective dilation rates of 1, 2, 4, 6, 8, 16 and 32. These dilated layers add multi-scale contextual information by increasing the receptive field without losing resolution.

FIG. 5 represents in detail the architecture of the dilated-residual convolutional neural network 14, wherein the two previous architectures are combined replacing the standard convolutional blocks 21 with residual blocks 30 and incorporating the dilated convolutional layers 40 in the connection 25 between the encoding and decoding paths.

Once the 3D images obtained by means of magnetic resonance have been partially segmented by each of the four previously described convolutional neural network (CNN) architectures, which have been previously trained, the outputs are averaged in order to obtain the final probability map 2. This final probability map is the basis for setting the thresholds in the next thresholding step 3, since it sets the threshold which determines whether a voxel will be part of the final mask 4. In one of the embodiments, all the voxels with a probability greater than 50% are established as an injury, in other words, they are segmented as part of an injury image mask, while the voxels with probabilities less than 50% are established as background.

Thus, a mask with the white matter injuries is provided at the output, which will be very useful especially for neurologists-radiologists, by concentrating the most relevant portions for the specialist analysis thereof, since the voxels corresponding to brain parenchyma and physiological hyperintensities have been filtered.

Prior to using the present invention, the array of neural networks has to be trained. In a first step for the training of the four CNN networks used, the necessary initial manual annotations are performed by specialist neuroradiologists. This initial segmentation consists of manually selecting the voxels corresponding to white matter injuries, excluding physiological hyperintensities, such as the ependymal layer. Next, the training process of each CNN architecture is performed, according to one of the embodiments of the invention, over 200 epochs with a batch size set at 30. In order to test the robustness of the CNN models to new data, a 5-iteration cross-validation is performed. Therefore, the training data set is divided into 5 subsets, using, in each iteration, 4 of them to train and the remaining subset to validate. The error obtained throughout the 5 iterations is averaged in order to calculate the final training error.

In order to update the weights of the networks iteratively during the training process, the Adam optimisation algorithm is used. The initial learning rate is set at 1e-5. The remaining hyperparameters ($\beta 1$, $\beta 2$, and $\zeta$) are kept at the default values thereof (0.9, 0.999 and 10-7 respectively), which are known to give good results.

One of the problems with the segmentation of white matter hyperintensities (WMH), such as the one performed by the present invention, is that the data set is generally very unbalanced, which means that the number of voxels established as white matter hyperintensity in comparison to the number of voxels established as background is very different. In order to solve this problem, different cost/loss functions are analysed:

DICE-coefficient loss (DCL): the DICE coefficient (DC) measures the spatial overlap between two segmentation masks. DCL is the inverse of DC.

$$DC(X, Y) = \frac{2|X \cap Y|}{|X| + |Y|} DCL(X, Y) = 1 - DC(X, Y)$$

Wherein X is the manual segmentation and Y is the prediction mask.

Binary cross-entropy (BCE): measures how far the predicted probability is from the actual label. It is widely used in classification models.

$$BCE = -\frac{1}{N} \sum_{i=1}^{N} y_i \cdot \log(p(y_i)) + (1 - y_i) \cdot \log(1 - p(y_i))$$

Wherein y is the true label (0 for the background and 1 for the region of interest) and p (y) is the probability that the voxel is the label y for all N voxels.

Tversky loss (TL), which has been shown to perform well when it comes to very unbalanced data sets.

$$TL = 1 - \frac{TP + \varepsilon}{TP + \alpha \cdot FN + (1 - \alpha) \cdot FN + \varepsilon}$$

Wherein $\alpha=0.7$ and $\varepsilon=1$; TP is the rate of true positives and FN is the rate of false negatives.

Focal Tversky loss (FTL): is an extension of the TL in order to focus on the difficult classes detected with lower probability, in other words, in small regions, since they do not contribute significantly to the loss.

$$FTL = (1 - TL)^{\frac{1}{\gamma}}$$

Wherein $\gamma=1.33$ and TL is the previously defined Tversky loss.

Once the functions listed above have been analysed and the cross-validation training has been performed for each of them, according to one of the embodiments of the present invention, the best results are offered by the Tversky loss function (TL). Therefore, in one embodiment of the invention, the network obtained is selected by using TL, which is the one used to perform the external validation.

In order to increase the generalisability of the models of the CNN networks and reduce overfitting, during the previous training process, different data augmentation techniques can be applied to each training batch on the fly. In one of the embodiments of the invention, two different transformations are randomly applied to these images: adding Gaussian noise to the image ($\mu=0$, $\sigma \varepsilon[0.2, 0.5]$) and applying rotations between $-10°$ and $10°$ to the image and the corresponding mask thereof.

Finally, the entire array formed by the neural networks, probability maps and the thresholding module which generates the final mask at the output thereof can be evaluated in order to determine the performance thereof and ensure that the precision is the one required. To do so, in one of the embodiments of the invention, the following parameters are calculated:

the DC coefficient, which varies from 0 to 1, wherein 0 means that there is no overlap between the two masks compared and 1 means complete overlap; and average symmetric surface distance (ASSD), which indicates the difference, on average, between both segmentation masks. Wherein, S(X) being the set of voxels of the surface of the mask X, the shortest distance from an arbitrary voxel v to S(X) is defined as:

$$d(v, S(X)) = \min_{s_x \in S(X)} \|v - s_x\|$$

wherein $\|\cdot\|$ denotes the Euclidean distance. The ASSD is the one given by:

$$ASSD(X, Y) = \frac{1}{|S(X)| + |S(Y)|} \left( \sum_{s_x \in S(X)} d(s_x, S(Y)) + \sum_{s_\gamma \in S(Y)} d(s_\gamma, S(X)) \right)$$

This optional evaluation is carried out once the cross-validation has been performed which guarantees the proper functioning of the architecture designed during the training process, for which reason if the evaluation results in any error, it would be caused by the differences between the training data set and the test data set. In this case, the solution is either to expand the data growth by applying more techniques or to increase the training data set in order to make it more robust.

The method and system for segmentation of white matter hyperintensities of magnetic resonance images of the present invention can be integrated into medical image processing and storage infrastructures.

The method of the present invention can be implemented by a computer, in a processor, a microprocessor, a server, a web server or the cloud. The algorithms and models described for implementing the neural networks and other processes of the present invention may be implemented as part of an operating system or a specific application, component, program, object, module, or sequence of instructions referred to as "computer programs". Computer programs typically comprise one or more instructions stored in various memory and storage devices which, when read and executed by one or more processors of a computer, cause the computer to perform the necessary operations. A person skilled in the art will be aware that different embodiments of the present invention can be implemented in a variety of manners, but the present description applies equally regardless of the particular type of machine or computer-readable medium used. Examples of computer-readable media include, but are not limited to, writable media such as volatile and non-volatile memory devices, floppy and other removable disks, hard drive units, optical discs (for example, compact disc read-only memory (CD ROM), digital versatile discs (DVD), etc.), among others, and transmission media such as digital and analog communication links.

The present invention should not be limited to the embodiment described herein. Other configurations may be carried out by those skilled in the art based on the present description. Accordingly, the scope of the invention is defined by the following claims.

The invention claimed is:

1. A method for segmenting white matter hyperintensities present in magnetic resonance brain images, the method performed by at least one processor, and the method comprising:

providing an array of previously trained convolutional neural networks, wherein each convolutional neural network of the array of previously trained convolutional neural networks is configured with an architecture that is different from other convolutional neural networks in the array of previously trained convolutional neural networks, wherein a convolutional neural network among the array of previously trained convolutional neural networks is configured to:

filter at least one magnetic resonance brain image based on one or more convolutional operations;

reducing the at least one magnetic resonance brain image based on one or more intermediate layers intercalated between convolutional layers or residual blocks and arranged in an encoding path;

enlarging the at least one magnetic resonance brain image based on convolutional transposition layers intercalated between the convolutional layers or the residual blocks and in a decoding path; and refining an output of a respective convolutional neural network based on deep supervision layers, the deep supervision layers being configured to combine an output from a second convolution layer of the convolutional layers and in the decoding path; and performing segmentation of white matter hyperintensities based on the at least one magnetic resonance brain image and the array of previously trained convolutional neural networks, wherein each convolutional neural network of the array of previously trained convolutional neural networks extracts characteristics of the at least one magnetic resonance brain image at a different level, and the segmentation including:

identifying voxels of the at least one magnetic resonance brain image containing white matter hyperintensities;

determining, for each convolutional neural network and for each identified voxel, a probability that an identified hyperintensity corresponds to a previously defined pathological hyperintensity;

calculating an average probability of all probabilities determined for each identified voxel;

comparing the average probability for each identified voxel with a pre-established threshold; and generating an image mask with one or more voxels among the voxels that exceed the pre-established threshold.

2. The method according to claim 1, further comprising a pre-processing of the at least one magnetic resonance brain image by:

re-sizing at least one 2D section of the at least one magnetic resonance brain image to a size of 256×256;

scaling one or more intensity values of the at least one 2D section between 0 and 1, according to a first equation:

$$I'_{i,j} = \frac{I_{i,j} - \min(I)}{\max(I) - \min(I)}$$

wherein I is a respective 2D section to be scaled, $I_{i,j}$ is an intensity value in row i and column j, min(I) is a minimum value of the respective 2D section, and max(I) is a maximum value of the respective 2D section; and standardizing each voxel based on a mean of a training data set and a standard deviation of the training data set, according to a second equation:

$$I''_{i,j} = \frac{I'_{i,j} - \mu}{\sigma}$$

wherein I' is a scaled intensity; μ is a mean intensity of a scaled training data set, and σ is a standard deviation of the scaled training data set.

3. The method according to claim 1, wherein the array of previously trained convolutional neural networks comprises one or more of a standard convolutional neural network, a residual convolutional neural network, a dilated convolutional neural network, and a dilated-residual convolutional neural network.

4. The method according to claim 1, which further comprises generating, for each of the convolutional neural networks, a probability map with all probabilities determined for each voxel of the at least one magnetic resonance brain image, and wherein the probability map is obtained based on a sigmoid activation function.

5. The method according to claim 1, wherein calculating the average probability of all probabilities for each identified voxel further comprises generating a total probability map.

6. The method according to claim 1, wherein the pre-established threshold is a probability of 50%.

7. The method according to claim 1, wherein at least one convolutional neural network is trained using a Tversky loss function.

8. A system for segmenting white matter hyperintensities present in magnetic resonance brain images, the system comprising:

at least one processor;

an arrangement of trained convolutional neural networks stored in memory, and the memory configured to store instructions that when executed by the at least one processor are configured to cause the at least one processor to:

receive a magnetic resonance brain image, identify voxels of the magnetic resonance brain image containing white matter hyperintensities, determine, for each trained convolutional neural network and for each identified voxel, a probability that an identified hyperintensity corresponds to a previously defined pathological hyperintensity, calculate an average probability of all probabilities determined for each voxel, compare the average probability for each voxel with a pre-established threshold, and generate an image mask with the voxels that exceed the pre-established threshold, wherein each of the trained convolutional neural networks of the arrangement are configured with a specific architecture that is different from other convolutional neural networks in the arrangement, wherein each one of the trained convolutional neural networks is configured to extract characteristics of the magnetic resonance brain image at a different level, and wherein a convolutional neural network among the arrangement is configured to:

filter the magnetic resonance brain image based on one or more convolutional operations, reducing the magnetic resonance brain image based on one or more intermediate layers intercalated between convolutional layers or residual blocks and arranged in an encoding path, enlarging the magnetic resonance brain image based on convolutional transposition layers intercalated between the convolutional layers or the residual blocks and in a decoding path, refining an output of the convolutional neural network based on deep supervision layers, the deep supervision layers being configured to combine an output from a second convolution layer of the convolutional layers and in the decoding path, and performing segmentation of white matter hyperintensities based on the at magnetic resonance brain image and the trained convolutional neural networks of the arrangement.

9. The system according to claim 8, wherein the arrangement comprises at least one standard convolutional neural network comprising:

a bottleneck section between the encoding path and the decoding path;

a sigmoid activation layer configured to generate a probability map.

10. The system according to claim 8, wherein the arrangement comprises at least one residual convolutional neural network comprising:

a bottleneck section between the encoding path and the decoding path;

a sigmoid activation layer configured to generate a probability map.

11. The system according to claim 8, wherein the arrangement comprises at least one dilated convolutional neural network comprising a bottleneck section between the encoding path and the decoding path, wherein the bottleneck section comprises dilated convolutional layers with different rates of dilation;

a sigmoid activation layer configured to generate a probability map.

12. The system according to claim 8, wherein the arrangement comprises at least one dilated-residual convolutional neural network comprising:

a bottleneck section between the encoding path and the decoding path, wherein the bottleneck section comprises dilated convolutional layers with different rates of dilation;

a sigmoid activation layer configured to generate a probability map.

13. The system according to claim 8, wherein the arrangement comprises a combination of a standard convolutional neural network, a residual convolutional neural network, a dilated convolutional neural network, and a dilated-residual convolutional neural network, wherein the arrangement is configured for an image input size of 256×256, and wherein all convolutional layers have a 3×3 receptive field, a batch normalisation layer, and a rectified linear unit layer.

* * * * *